(12) United States Patent
Marr et al.

(10) Patent No.: US 9,588,213 B2
(45) Date of Patent: Mar. 7, 2017

(54) ANALOG SIGNAL PROCESSING METHOD FOR ACCURATE SINGLE ANTENNA DIRECTION FINDING

(71) Applicant: Raytheon Company, Waltham, MA (US)

(72) Inventors: Harry Marr, Manhattan Beach, CA (US); Walter B. Schulte, Jr., Huntingdon Beach, CA (US); John P. Gianvittorio, Venice, CA (US)

(73) Assignee: RAYTHEON COMPANY, Waltham, MA (US)

( * ) Notice: Subject to any disclaimer, the term of this patent is extended or adjusted under 35 U.S.C. 154(b) by 468 days.

(21) Appl. No.: 14/182,505

(22) Filed: Feb. 18, 2014

(65) Prior Publication Data

US 2015/0234030 A1    Aug. 20, 2015

(51) Int. Cl.
*G01S 5/02* (2010.01)
*G01S 3/14* (2006.01)
*G01S 3/46* (2006.01)
*G01S 3/808* (2006.01)

(52) U.S. Cl.
CPC ........ *G01S 3/14* (2013.01); *G01S 3/46* (2013.01); *G01S 3/808* (2013.01)

(58) Field of Classification Search
CPC .............. G01S 3/46; G01S 3/808; G01S 3/14
USPC ........................................ 342/139, 140, 417
See application file for complete search history.

(56) References Cited

U.S. PATENT DOCUMENTS

| 2,989,744 A | 6/1961 | Pettit |
| 3,170,158 A | 2/1965 | Rotman |
| 3,720,952 A | 3/1973 | Lawsine |
| 3,992,099 A * | 11/1976 | Laughlin .............. G01J 9/00 250/206.1 |
| 4,328,496 A | 5/1982 | White |
| 4,613,863 A | 9/1986 | Mitchell |
| 5,032,839 A | 7/1991 | Even-Or |
| 5,717,620 A | 2/1998 | Williams |
| 6,091,704 A | 7/2000 | Butash |

(Continued)

FOREIGN PATENT DOCUMENTS

| CA | 1229926 A1 | 12/1987 |
| CN | 101241535 A | 8/2008 |

(Continued)

OTHER PUBLICATIONS

A. W. Houghton and C. D. Reeve, "Direction finding on spread-spectrum signals using the time-domain filtered cross spectral density," in IEE Proceedings—Radar, Sonar and Navigation, vol. 144, No. 6, pp. 315-320, Dec. 1997.*

(Continued)

*Primary Examiner* — Marcus Windrich
(74) *Attorney, Agent, or Firm* — Cantor Colburn LLP

(57) ABSTRACT

Embodiments are directed to receiving an incoming signal, converting, by an analog circuit, the signal to a discrete time signal, applying, by the analog circuit, a transformation algorithm to the discrete time signal to obtain frequency samples of the discrete time signal, applying, by the analog circuit, a cross correlation algorithm to the frequency samples to obtain a cross spectral density (CSD), detecting, by the analog circuit, phase slopes associated with the CSD, and calculating an angle of arrival (AoA) of the incoming signal based on the phase slopes.

15 Claims, 5 Drawing Sheets

(56) References Cited

U.S. PATENT DOCUMENTS

| | | | |
|---|---|---|---|
| 6,104,346 A * | 8/2000 | Rudish | G01S 3/04 |
| | | | 342/156 |
| 6,222,409 B1 * | 4/2001 | Kieda | H03H 11/26 |
| | | | 327/268 |
| 6,285,197 B2 | 9/2001 | Walker et al. | |
| 6,898,235 B1 | 5/2005 | Carlin et al. | |
| 7,801,228 B2 | 9/2010 | Lehne et al. | |
| 8,578,256 B2 | 11/2013 | Graef | |
| 2001/0011893 A1 | 8/2001 | Walker et al. | |
| 2001/0022811 A1 | 9/2001 | Lillington | |
| 2003/0112904 A1 | 6/2003 | Fuller et al. | |
| 2003/0133524 A1 | 7/2003 | Miller et al. | |
| 2004/0189384 A1 | 9/2004 | Kemna et al. | |
| 2007/0223607 A1 | 9/2007 | Lehne et al. | |
| 2007/0223754 A1 * | 9/2007 | Roeck | H04R 25/552 |
| | | | 381/313 |
| 2009/0163161 A1 | 6/2009 | Robinson et al. | |
| 2010/0315292 A1 * | 12/2010 | Cui | G01S 3/808 |
| | | | 342/444 |
| 2011/0103430 A1 * | 5/2011 | Witrisal | H04L 5/0007 |
| | | | 375/142 |
| 2011/0260911 A1 * | 10/2011 | Sapp | G01S 3/10 |
| | | | 342/156 |
| 2011/0274222 A1 | 11/2011 | Hinson | |
| 2014/0105416 A1 | 4/2014 | Huttunen et al. | |
| 2014/0210666 A1 | 7/2014 | Maltsev et al. | |
| 2014/0241463 A1 | 8/2014 | Leenaerts et al. | |

FOREIGN PATENT DOCUMENTS

| | | |
|---|---|---|
| EP | 0344794 A2 | 12/1989 |
| EP | 1596220 B1 | 11/2005 |
| EP | 2425635 A1 | 8/2013 |
| EP | 2728770 A2 | 5/2014 |
| EP | 2779473 A2 | 9/2014 |
| FR | 2689249 A1 | 10/1993 |
| GB | 2308034 A | 6/1997 |
| KR | 20080020078 a | 3/2008 |
| WO | 9306502 A1 | 4/1993 |
| WO | 9939517 A3 | 10/1999 |
| WO | 0011823 A1 | 3/2000 |
| WO | 0041340 A1 | 7/2000 |
| WO | 2005050241 A3 | 6/2005 |
| WO | 2012024507 A2 | 2/2012 |

OTHER PUBLICATIONS

International Search Report and Written Opinion; International Application No. PCT/US2015/033207; International Filing Date: May 29, 2015; Date of Mailing: Sep. 17, 2015; 11 pages.
Akpa et al., "N-parallel filter bank equivalent to tree structure", Electrical and Computer Engineering Conference Proceedings, 1994, pp. 494-496.
International Search Report and Written Opinion; PCT Application No. PCT/US2015/025537; International Filing Date: Apr. 13, 2015; Mailing Date: Jul. 28, 2015; 12 pages.
Lillington, "Flexible channelisation architectures for Software Defined Radio front ends using a Tuneable Pipelined Frequency Transform", IET Seminar Digest, vol. 2003, No. 1, 2003, pp. 1-13.
Ahnstrom et al., "Detection and direction-finding of spread spectrum signals using correlation and narrowband interference rejection", Proc. Nordic Matlab Conference, Copenhagen, Denmark, 2003, 5 pages.
Holler et al. "A 2-20-GHz Analog Lag Correlator for Radio Interferometry", IEEE Transactions on Instrumentation and Measurement, vol. 61, No. 8, Aug. 2012, pp. 2253-2261.
Houghton et al., "Direction finding on spread-spectrum signals using the time-domain filtered cross spectral density", IEEE Proceedings of Radar, Sonar and Navigation, vol. 144, No. 6, Dec. 1997, pp. 315-320.
Lambrecht et al., "True-Time-Delay Beamforming With a Rotman-Lens for Ultrawideband Antenna Systems", IEEE Transactions on Antennas and Propagation, vol. 58, No. 10, Oct. 2010, pp. 3189-3195.
Zhang et al., "Reconfigurable beam forming using phase-aligned Rotman lens", www.ietdl.org, The Institute of Engineering and Technology, 2012, pp. 326-330.
PCT International Search Report and Written Opinion; International Application No. PCT/US2015/039877; International Filing Date: Jul. 10, 2015; Date of Mailing: Oct. 6, 2015; 12 pages.
Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.
International Search Report and Written Opinion; International Application No. PCT/US2015/016298; International Filing Date: Feb. 18, 2015; Date of Mailing: May 11, 2015; 14 pages.
Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.
Chang et al., "Reconfigurable Architectures for Low Complexity Software Radio Channelizers using Hybrid Filter Banks," 10th IEEE Singapore International Conference on Communication systems, Oct. 2006, pp. 1-5.
Darak et al., "A reconfigurable filter bank for uniform and non-uniform channelization in multi-standard wireless communication receivers," IEEE 17th International Conference on Telecommunications (ICT), Apr. 4-7, 2010, pp. 951-956.
Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.
Lillington, "The pipelined frequency transform (PFT)", RF Engines, Electronic Engineering, Jun. 17, 2002, pp. 1-5.
Mahesh et al., "Coefficient decimation approach for realizing reconfigurable finite impulse response filters," IEEE International Symposium on Circuits and Systems, ISCAS, May 18-21, 2008, pp. 81-84.
Mahesh et al., "Reconfigurable low area complexity filter bank architecture based on frequency response masking for nonuniform channelization in software radio receivers", IEEE Transactions on Aerospace and Electronic Systems, vol. 47, No. 2, Apr. 2011.
Navarro et al. "Non-uniform channelization methods for next generation SDR PMR base stations", 2011 IEEE Symposium on Computers and Communications, Jul. 2011, pp. 620-625.
Sju, "Pipelined Frequency Transform PFT", RF Engines Limited Data Sheet, Apr. 29, 2002, pp. 1-25.
Smitha et al., "A new low power reconfigurable decimation interpolation and masking based filter architecture for channel adaptation in cognitive radio handsets," Physical Communication, 2, Jan. 2009, pp. 47-57.

* cited by examiner

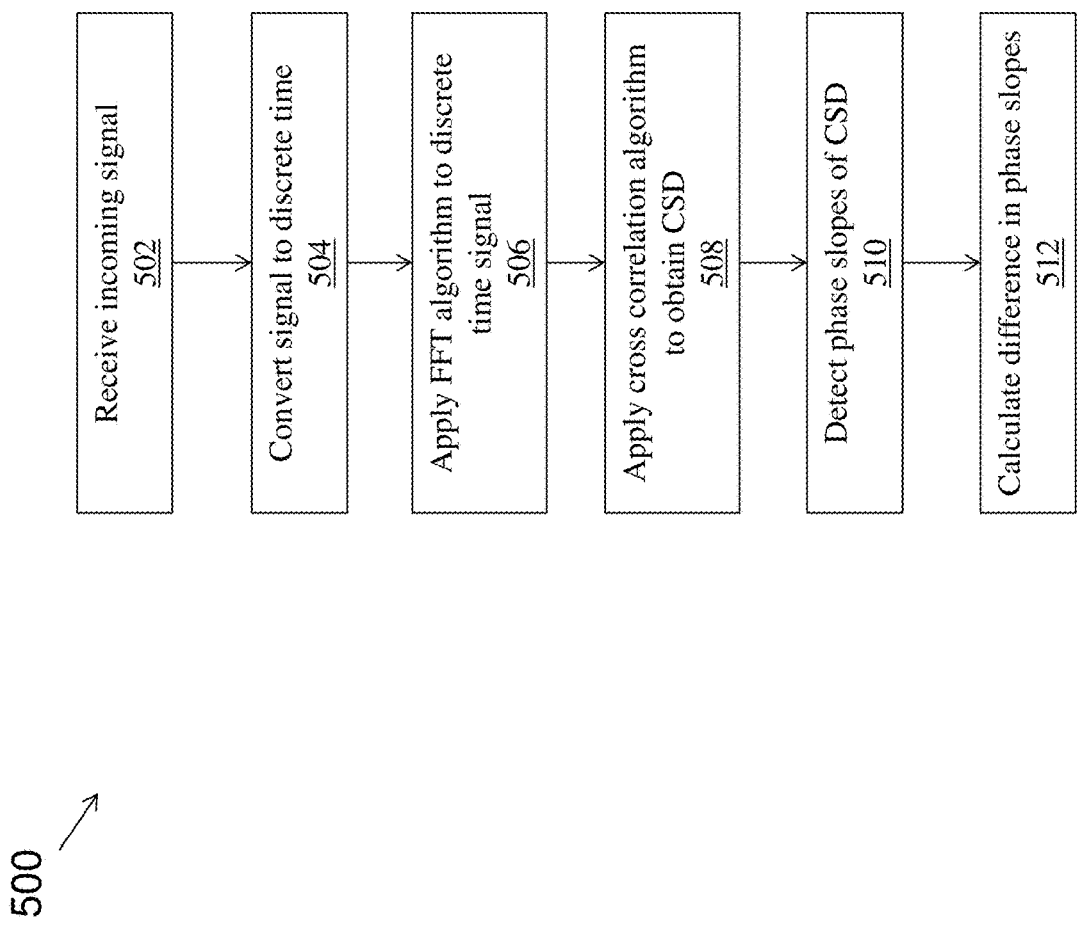

ANALOG SIGNAL PROCESSING METHOD FOR ACCURATE SINGLE ANTENNA DIRECTION FINDING

BACKGROUND

The present disclosure relates to electronics, and more specifically, to analog signal processing used to determine an angle of arrival (AoA) of an incident wave on an array.

Determining an AoA of an incident wave or signal on an array is of interest in a variety of applications, such as radar and aerospace applications. For example, signals that are detected can be wideband in nature with a low signal-to-noise ratio (SNR) and subject to narrowband interference.

Current implementations for detecting signals accurately are digital in nature, cannot be ultra wideband due to limitations in analog-to-digital converter (ADC) technology, and are size, weight, power, and cost (SWAP-C) intensive. Other approaches in analog use multiple antennas to detect or get the AoA, resulting in a wide angle. Still other techniques use a phase slope of a cross spectral density (CSD). But, use of CSD has only been accomplished with digital circuitry, resulting in a SWAP-C penalty and limiting wideband operation.

SUMMARY

According to one embodiment, a method comprises: receiving an incoming signal, converting, by an analog circuit, the signal to a discrete time signal, applying, by the analog circuit, a transformation algorithm to the discrete time signal to obtain frequency samples of the discrete time signal, applying, by the analog circuit, a cross correlation algorithm to the frequency samples to obtain a cross spectral density (CSD), detecting, by the analog circuit, phase slopes associated with the CSD, and calculating an angle of arrival (AoA) of the incoming signal based on the phase slopes.

According to another embodiment, an apparatus comprises: a first analog circuit configured to generate frequency samples associated with a continuous incoming signal, a second analog circuit configured to obtain a cross spectral density (CSD) based on the frequency samples, a third analog circuit configured to detect phase slopes associated with the CSD, and a fourth circuit configured to calculate an angle of arrival (AoA) of the incoming signal based on the phase slopes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 5 illustrates a flow chart of an exemplary method.

DETAILED DESCRIPTION

Figure 1:
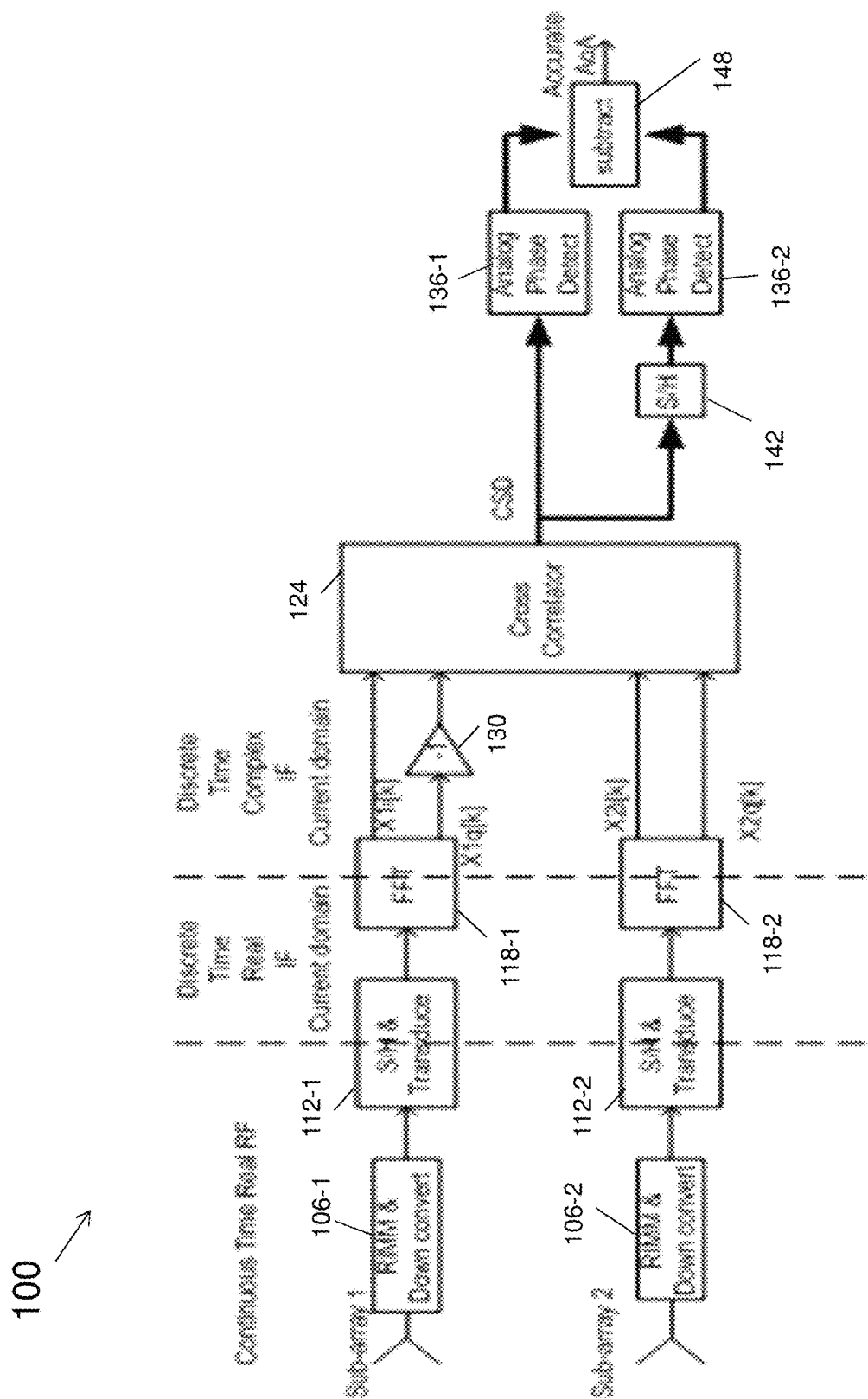
FIG. 1 is a block diagram of an exemplary system.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining or detecting an angle of arrival (AoA) associated with an incident wave or signal. Analog circuitry performs the detection of the AoA, resulting in a low size, weight, power, and cost (SWAP-C) implementation across a wide bandwidth (e.g., up to 20 GHz). In some embodiments, an analog correlator is constructed using wire delays and analog multipliers to apply a complex weight and sum. Sample-and-hold (S/H) circuits, potentially in combination with one or more amplifiers, are used to facilitate a discrete time analog fast Fourier transform (FFT). A direction filter is implemented in analog to calculate a direction-filtered cross spectral density (CSD). A phase slope of the CSD is used to calculate AoA. Some or all of the implementation is conducted in analog and/or at radio frequency (RF). In some embodiments, the AoA is detected or calculated to within 1 degree of accuracy.

Referring to FIG. 1, a system 100 is shown. The system 100 determines or detects an AoA associated with an incoming wave or signal. The incoming signal may be an RF signal and may be continuous in nature.

The incoming signal is incident upon one or more sub-arrays, such as sub-array 1 and sub-array 2 in FIG. 1. The sub-arrays correspond to spatially-separated antennas or antenna elements. The incoming signal is incident upon a first of the sub-arrays (e.g., sub-array 1) at a first time that is different from (e.g., earlier than) a second time that the incoming signal is incident upon one or more other sub-arrays (e.g., sub-array 2).

Sub-array 1 and sub-array 2 are coupled to receivers 106-1 and 106-2, respectively. The receivers 106-1 and 106-2 receive the incoming signal. The receivers 106-1 and 106-2 may include components or devices of a type known to one of skill in the art, such as low noise amplifiers (LNAs), frequency down-converters, and the like.

Figure 2:
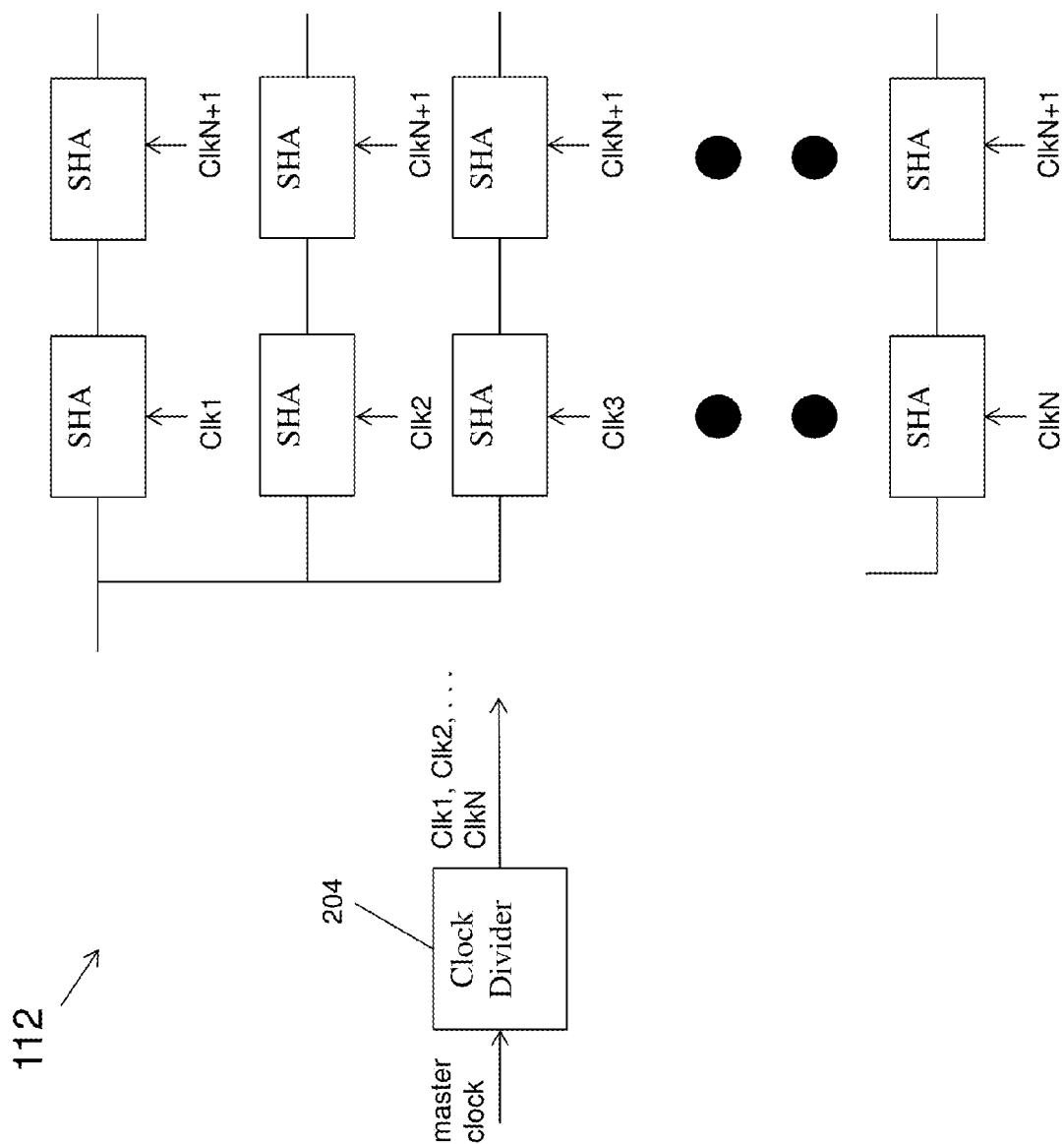
FIG. 2 illustrates a diagram of an exemplary sample-and-hold circuit.

The receivers 106-1 and 106-2 are coupled to S/H circuits 112-1 and 112-2, respectively. As shown in FIG. 2, the S/H circuits 112-1 and 112-2 are configured to turn the received, continuous signal into a discrete time signal or samples of a discrete time signal based on an application of a number 'N' of clocks, denoted as Clk1, Clk2, Clk3, . . . ClkN, to one or more sample-and-hold amplifiers (SHAs). A clock divider 204 generates one or more of the clocks Clk1, Clk2, Clk3, . . . ClkN based on a division of an input master clock. The S/H circuits 112-1 and 112-2 may implement a serial-to-parallel conversion.

Referring back to FIG. 1, the S/H circuits 112-1 and 112-2 are coupled to fast Fourier transform (FFT) circuits 118-1 and 118-2, respectively. The FFT circuits 118-1 and 118-2 may be implemented as an 'n'-point FFT, where the value for 'n' is set by a frequency resolution that may be required in a given application or environment.

Figure 3:
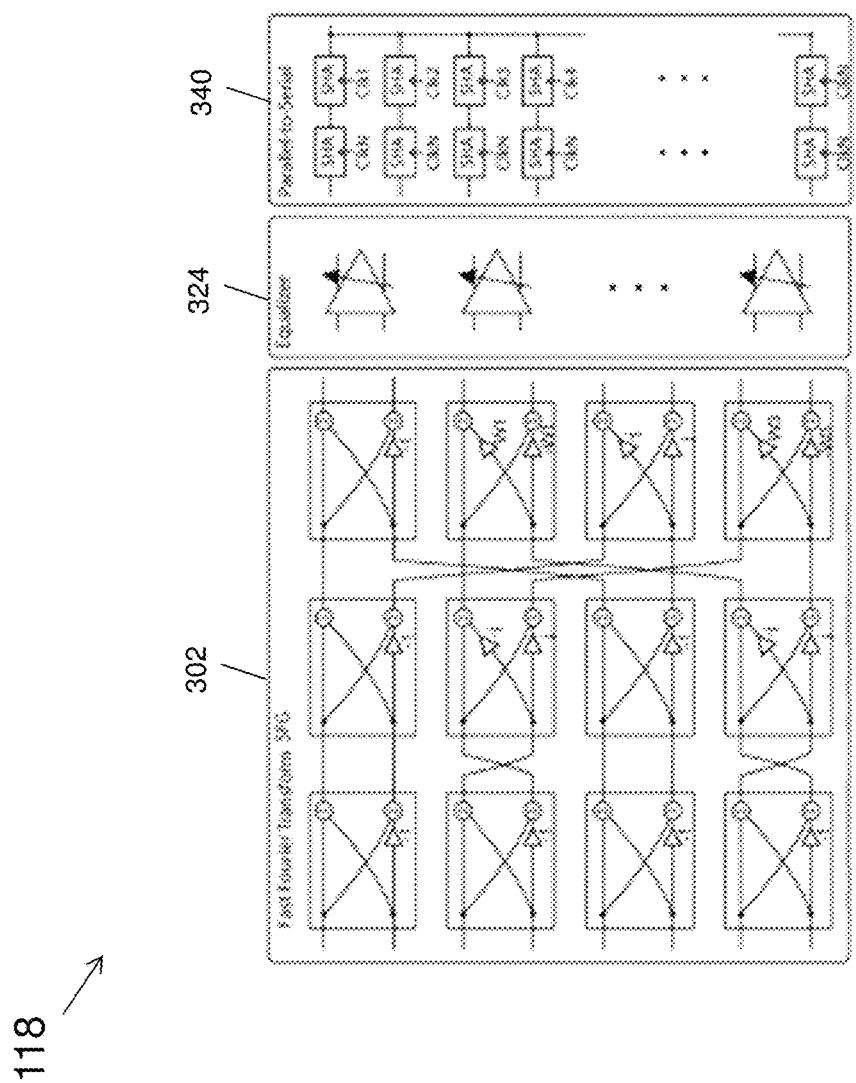
FIG. 3 illustrates a diagram of an exemplary circuit configured to implement a fast Fourier transform algorithm.

As shown in FIG. 3, the FFT circuits 118-1 and 118-2 of FIG. 1 may include a FFT signal flow graph (SFG) 302. The SFG 302 generates and outputs frequency samples corresponding to the discrete time samples generated by the S/H circuits 112. The outputs of the SFG 302 are provided to an equalizer 324. The equalizer 324 is configured to strengthen (e.g., boost) or weaken (e.g., cut) the energy of specific frequencies or frequency bands. The output of the equalizer 324 is coupled to a parallel to serial converter 340. The parallel-to-serial converter 340 generates a constant stream output. The parallel-to-serial converter 340 includes clocked SHAs similar to those described above in connection with the S/H circuits 112-1 and 112-2.

Referring back to FIG. 1, the FFT circuits 118-1 and 118-2 are coupled to a cross correlator circuit 124. The output of a first of the FFT circuits (e.g., FFT circuit 118-1) is subject to an amplifier or phase shift circuit 130 relative to the output of a second of the FFT circuits (e.g., FFT circuit 118-2). The circuit 130 generates the complex conjugate of the output of one FFT circuit relative to the other FFT circuit. The output of the cross correlator provides the CSD.

Figure 4:
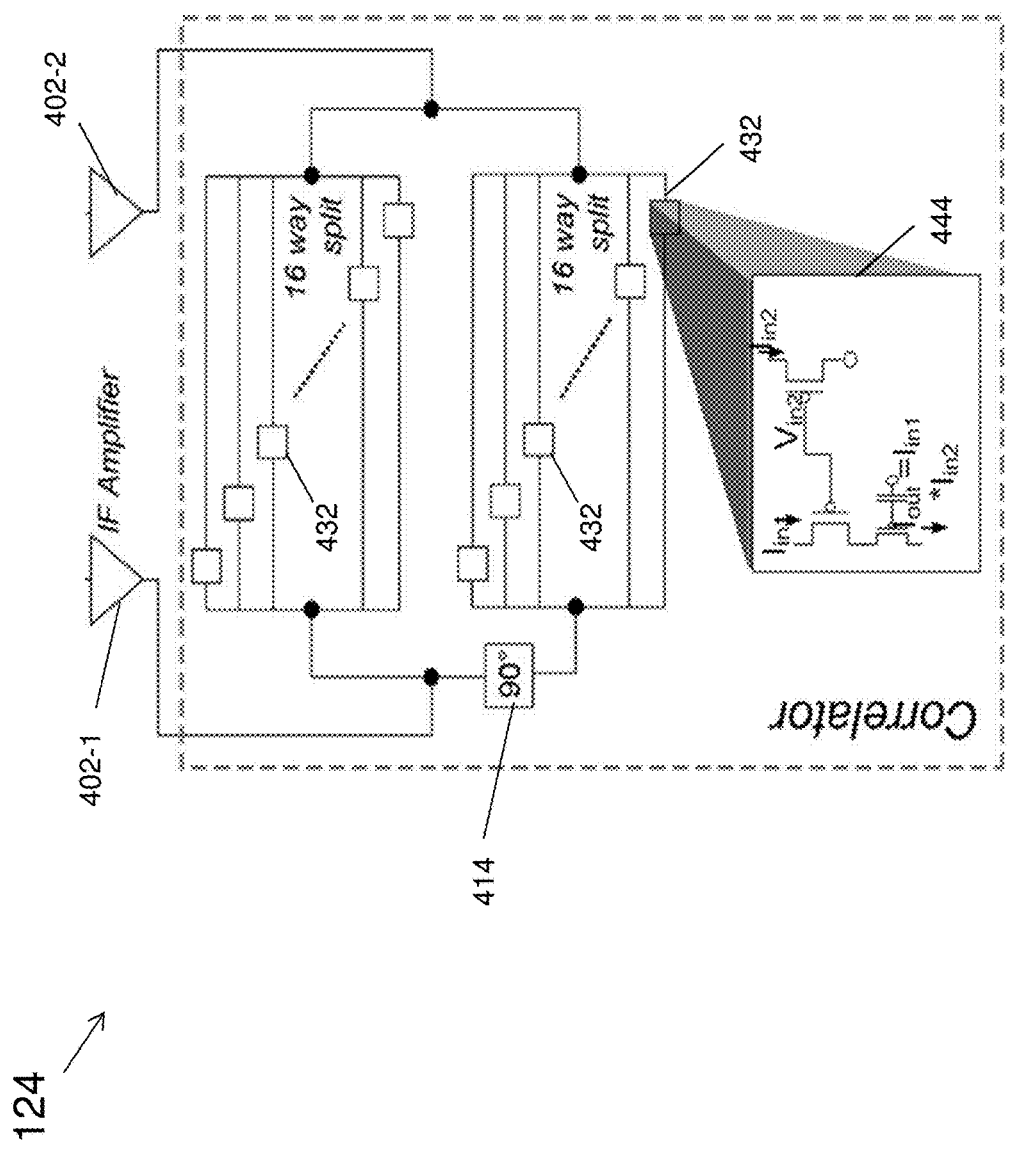
FIG. 4 illustrates a diagram of an exemplary circuit of a cross correlator.

Referring to FIG. 4, an embodiment of the cross correlator circuit 124 is shown. The inputs to the cross correlator 124 are subject to one or more intermediate frequency (IF) amplifiers, such as amplifiers 402-1 and 402-2. A phase shift 414 of, e.g., 90 degrees is introduced in the output of one of the amplifiers (e.g., amplifier 402-1). The signals are subject to one or more lengths of line, where the length of the line results in a delay in signal in the analog domain. In FIG. 4, the various lines are shown as a 16-way split. Multiplier circuits (denoted as boxes 432) are present at various points along the lines.

An embodiment of a multiplier circuit 432 is shown in box 444 of FIG. 4. The multiplier circuit 432/444 includes one or more transistors arranged as shown. An input current (denoted as Iin2) is transduced into a voltage weight (Vin2). A second input current (denoted as Iin1) is multiplied by weight Vin2 and calibrated by a programmable floating gate to generate an output current (Iout) that is equal to, or proportional to, the product of the input currents Iin1 and Iin2. Thus, Iout is a function of currents Iin1 and Iin2. Of course, other techniques for performing multiplication could be used, such as a charge domain multiply or voltage domain multiply. In some embodiments, a charge is held on a gate of one of the transistors using a digital to analog converter (DAC) with a constant value wired to the gate.

Referring back to FIG. 1, the cross correlator circuit 124 is coupled to one or more phase detect circuits 136-1 and 136-2. The output of the cross-correlator 124 is subject to a S/H circuit 142 with respect to one of the phase detect circuits (e.g., phase detect circuit 136-2). The phase detect circuits 136-1 and 136-2 are configured to detect a phase slope of the CSD. The outputs of the phase detect circuits 136-1 and 136-2 are subtracted 148 from one another, which provides an indication of the AoA of the incoming or incident wave or signal.

Referring now to FIG. 5, a flow chart of an exemplary method 500 is shown. The method 500 may execute in accordance with one or more devices, components, or systems, such as those described herein. The method 500 is used to determine an AoA associated with an incoming or incident wave or signal.

In block 502, the incoming signal is received. For example, one or more sub-arrays or elements, such as one or more antennas or antenna elements, receives the incoming signal.

In block 504, the received signal is converted to a discrete time signal or discrete time signal samples. As part of block 504, the received signal is subject to serial-to-parallel conversion.

In block 506, a FFT algorithm is applied to the discrete time signal or discrete time signal samples. In this manner, a transition is made from a discrete time analog domain to a discrete time complex domain. The FFT algorithm is applied to obtain frequency components or samples.

In block 508, the output of the FFT algorithm of block 506 is applied to a cross correlation algorithm. The cross correlation algorithm is applied to obtain the CSD.

In block 510, one or more phase slopes of the CSD is detected.

In block 512, a difference in the phase slopes of block 510 is calculated to generate the AoA.

Embodiments of the disclosure include analog circuits configured to calculate a CSD and phase slope of the CSD. The analog circuits may operate in conjunction with one or more frequency bands, such as the X-band and the Ku band. The analog circuits may be ultra wideband and may operate from direct current (DC) to 12 GHz and beyond. The analog circuits use several orders of magnitude less power than corresponding digital circuits.

In some embodiments various functions or acts may take place at a given location and/or in connection with the operation of one or more apparatuses, systems, or devices. For example, in some embodiments, a portion of a given function or act is performed at a first device or location, and the remainder of the function or act is performed at one or more additional devices or locations.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving an incoming signal;
   converting, by an analog circuit, the signal to a discrete time signal;
   applying, by the analog circuit, a transformation algorithm to the discrete time signal to obtain frequency samples of the discrete time signal;
   applying, by the analog circuit, a cross correlation algorithm to the frequency samples to obtain a cross spectral density (CSD), the cross correlation algorithm comprising application of a plurality of lines of differing length to generate delay in an analog domain;

detecting, by the analog circuit, phase slopes associated with the CSD; and calculating, via an electronic analog direction filter, an angle of arrival (AoA) of the incoming signal based on the phase slopes, wherein each of the plurality of lines is associated with a multiply circuit.

2. The method of claim 1, wherein the AoA is calculated by the analog circuit based on a difference in the phase slopes.

3. The method of claim 1, wherein the transformation algorithm comprises a fast Fourier transform (FFT).

4. The method of claim 1, wherein the incoming signal is received by a plurality of sub-arrays.

5. The method of claim 1, wherein the discrete time signal is generated using a sample-and-hold circuit that performs serial-to-parallel conversion.

6. The method of claim 1, wherein the multiply circuit comprises three transistors that generate an output current as a function of a product of two input currents.

7. The method of claim 6, wherein one of the transistors comprises a programmable floating gate or wherein a charge is held on a gate of one of the transistors using a digital to analog converter with a constant value wired to the gate.

8. An apparatus comprising:
a first analog circuit configured to generate frequency samples associated with a continuous incoming signal;
a second analog circuit configured to obtain a cross spectral density (CSD) based on the frequency samples, the second analog is configured to obtain the CSD based on an application of a plurality of lines of differing length to generate delay in an analog domain;
a third analog circuit configured to detect phase slopes associated with the CSD; and
a fourth circuit configured to calculate an angle of arrival (AoA) of the incoming signal based on the phase slopes,
wherein each of the plurality of lines is associated with a multiply circuit.

9. The apparatus of claim 8, wherein the first analog circuit is configured to apply a Fourier transform (FT) algorithm to a discrete time representation of the incoming signal.

10. The apparatus of claim 8, wherein the multiply circuit comprises three transistors configured to generate an output current as a function of a product of two input currents.

11. The apparatus of claim 10, wherein the multiply circuit is configured to transduce a first of the two input currents into a voltage weight.

12. The apparatus of claim 11, wherein a second of the two input currents is multiplied by the voltage weight and calibrated by a programmable floating gate to generate the output current.

13. The apparatus of claim 8, further comprising:
at least one array coupled to receivers configured to receive the incoming signal; and
respective sample-and-hold circuits coupled to one of each of the receivers and the first analog circuit, wherein each of the sample-and-hold circuits is configured to generate a discrete time representation of the incoming signal.

14. The apparatus of claim 13, wherein the at least one array comprises at least two sub-arrays.

15. The apparatus of claim 8, wherein a first output of the first analog circuit coupled to the second analog circuit corresponds to a complex conjugate of a second output of the first analog circuit coupled to the second analog circuit.

* * * * *